April 16, 1968  J. P. MORGAN  3,378,761
NONDESTRUCTIVE TESTING DEVICE FOR TESTING WIRE ROPES
AND SIMILARLY SHAPED OBJECTS
Filed Dec. 21, 1965

INVENTOR
JOHN P. MORGAN
BY Emery L. Groff
ATTY

United States Patent Office 3,378,761
Patented Apr. 16, 1968

3,378,761
NONDESTRUCTIVE TESTING DEVICE FOR TESTING WIRE ROPES AND SIMILARLY SHAPED OBJECTS
John Philip Morgan, South Coogee, near Sydney, New South Wales, Australia, assignor to Unisearch Limited, Kensington, New South Wales, Australia, a company of Australia
Filed Dec. 21, 1965, Ser. No. 515,345
Claims priority, application Australia, Jan. 4, 1965, 53,549/65
4 Claims. (Cl. 324—37)

ABSTRACT OF THE DISCLOSURE

A search coil of the solenoid type, primarily used for testing wire ropes or similar elongated objects for breakages therein, is made up of a plurality of insulated conductors which are curved spirally and parallel to each other on a flexible core of non-magnetic material. This conductor combination is wound around the rope to be tested and means are provided at the conductor ends to connect all conductors in series and the free ends of the first and last conductor respectively to an indicating device or meter.

---

Figure 1:
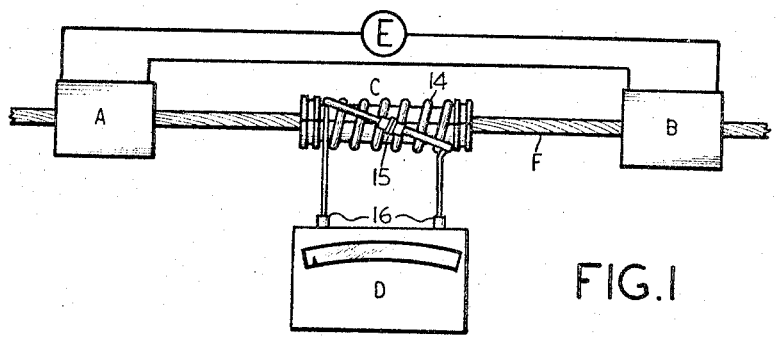

This invention relates to search coils used in nondestructive testing of wire ropes and similarly shaped objects which have magnetic and/or electrical properties and more particularly to search coils of the solenoid type.

Search coils are used in apparatus for the non-destructive testing, to sense variations in the magnetic and/or electrical properties of the objects under test. Leads from the search coils are connected to amplifying or interpretive electrical or electronic instruments thereby providing the means by which signals are conveyed from the search coil to the amplifying and/or interpretive equipment.

In apparatus of the type referred to a magnetic field is created in the test objects by means of permanent or electro-magnets on each side of the search coil and the testing is carried out by relative movement between the apparatus and the test object. In one form of apparatus a coil is arranged in juxtaposition to the search coil and fed from an A.C. current source whereby the two coils form a transformer with the test object forming the core thereof.

One known type of search coil comprises a single-wire solenoid which surrounds the test object. To permit the coil to be placed around the test object, connecting joints are provided for each turn of the coil. The effective sensing ability of this type of search coil is directly related to the number of turns of the coil. This sensing ability is therefore also related to the number of connecting joints. There are practical limitations on the number and position of these connecting joints.

Another type of search coil comprises multi-turn loops or pads, which are shaped to conform to the surface of the test object, this type requires that the test object passes in close proximity to the multi-turn loop or pads of conducting wire. In this construction a sufficient number of the shaped multi-turn sensing loops are made to surround the test object completely. In this case the test object does not pass through the individual sensing elements but through a group of shaped elements or multi-turn loops, which are easily dismountable.

While this arrangement minimises the number of connecting joints, the sensitivity of the multi-turn loops is such that only very small clearances between the surface of the test object and the sensing loops are permissible and from a practical point of view this is undesirable.

It is an object of this invention to provide a search coil for apparatus of the type referred to which has high sensing i.e. fault detecting efficiency, and which is easily and readily positioned around the test object.

The above object is achieved according to the invention by a search coil comprising a plurality of insulated conductors wound spirally and parallel to each other on a flexible core of nonmagnetic material to form a conductor assembly, means for connecting said conductors in series, means to connect the free end of the first and last conductor to an indicating device, said conductor assembly being adapted for spirally winding on the object to be tested.

In one form of the invention a split nonmagnetic former is interposed between the test object and the conductor assembly of the search coil.

Figure 2:
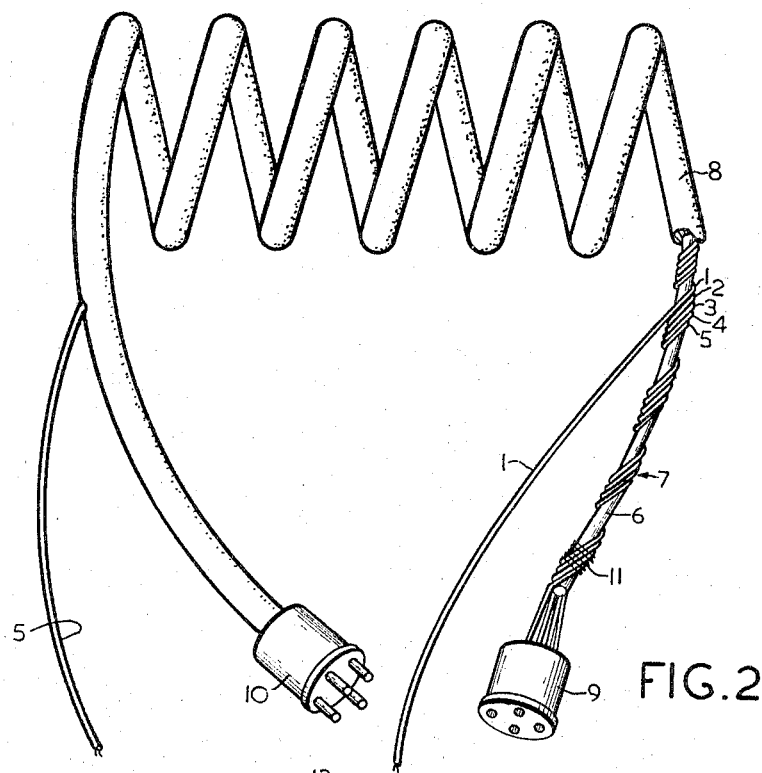
Figure 3:
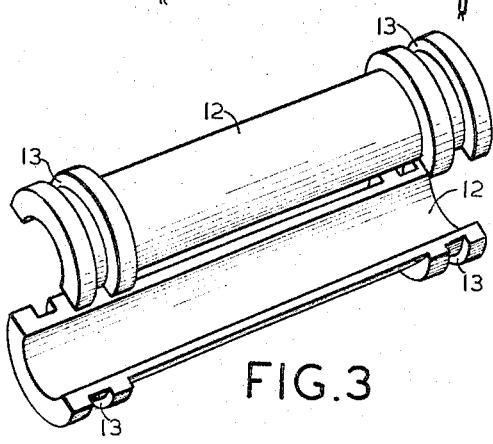

One embodiment of the invention is described with reference to the annexed drawings wherein:

FIGURE 1 shows schematically a testing apparatus incorporating a search coil according to the invention.
FIGURE 2 shows the search coil.
FIGURE 3 is a perspective view of a former for use in connection with the search coil.

As illustrated in FIGURE 1 the testing apparatus comprises two electro-magnets A and B, energised from a common source E. A search coil C is arranged between the magnets A and B and is electrically connected to an amplifying and/or interpretive instrument D. The wire rope F which is to be tested passes through the electro-magnets A and B and the search coil C whereby relative movement between the wire rope F and the search coil C with its associated magnets A and B senses and records on instrument D any fault in the wire rope F.

The construction of the search coil C is shown in detail in FIGURE 2.

As illustrated five wires 1 to 5 are seized by a suitable binding 11 at one end of a non-magnetic core 6 formed of plastic tubing.

The insulated wires are then laid side by side in a spiral as indicated at 7 along the core, the length of the wires and the core is determined from the physical characteristics of the test object. Binding cotton or some similar material can be used to keep the individual wires in place as they are wound on the core.

The wires are firmly bound adjacent the respective ends and the conductor assembly is then impregnated with a suitable insulating varnish. Preferably the conductor assembly is enclosed in a flexible sheath 8 with the ends of the wires projecting therefrom.

The ends of each insulated wire are identified and to one end a female connecting plug 9 is connected to all but wire 1 and a male connecting plug 10 is connected to all but wire 5 at the other end of the wound wire core. The connection is such that on connecting the male and female plugs, the individual wires will be connected in series. The free ends of wires 1 and 5 are adapted for connection to the amplifying or interpretive instrument D.

To mount the conductor assembly on the test object it is preferred to firstly place a split nonmagnetic former 12 (FIGURE 3) around the test object. The two parts of the former 12 are for example secured together by a tye accommodated in grooves 13 formed in the parts. The former is freely slidable on the test object. The conductor assembly is then spirally wound on the former 12 as indicated at 14 (FIGURE 1). When the winding is complete in one direction, a reverse winding or windings is made so that the male and female plugs can be connected as indicated at 15. The two free ends of wires 1 and 5 are then coupled to the amplifying or interpretive instrument D as indicated at 16.

It will be appreciaetd that the number of turns of wire spirally wound on the core can be varied to suit the characteristics of test object and also the strength of the signal required.

When the search coil is used for testing wire ropes that are in a fixed position such as a cable in a mine, the split former 12 is placed around the cable (wire rope F) and then the search coil is wound on the former as hereinbefore described.

The search coil may then be moved along the cable or the cable may be moved through the search coil at a suitable speed to test for faults. A speed of about three feet per second has been found to give an effective signal.

The arrangement of the individual wires in the form of a conductor assembly simplifies the winding of the coil on the former for a predetermined number of windings as, for example with five wires and ten windings on the former fifty effective windings are placed on the former (whereby one winding may be noneffective being a return winding to connect the plug and socket). In addition the sensitivity of the coil is considerably increased further by arranging each wire spirally on the common core.

I claim:

1. A nondestructive testing device for testing of wire ropes and similarly shaped objects, comprising, a search coil (C) of the solenoid type, said search coil (C) including a split nonmagnetic former (12) having an internal diameter larger than the diameter of the object to be tested and adapted to be placed around said object, a conductor assembly wound spirally on said former, said conductor assembly comprising a flexible core (6) of nonmagnetic material and a plurality of insulated conductors (1–5) wound spirally and parallel to each other in a single layer on said core (6), connector means (9, 10) at each end of a plurality of said conductors connecting said conductors in series, and means (16) connecting the free end of the first and last of said conductors respectively to an indicating device.

2. A nondestructive testing device according to claim 1, wherein the means to make the series connections of the plurality of said conductors comprises a multi-pin plug (10) and a complementary socket (9).

3. A nondestructive testing device according to claim 1, wherein said flexible core (6) is a plastic tube.

4. A nondestructive testing device according to claim 1, wherein said conductor assembly is impregnated and enclosed by a flexible protective sheath (8).

References Cited

UNITED STATES PATENTS

| | | | |
|---|---|---|---|
| 1,481,585 | 1/1924 | Beard | 336—180 X |
| 1,860,859 | 5/1932 | Keinath | 336—107 X |
| 2,450,429 | 10/1948 | Henning | 174—113 |
| 2,573,439 | 10/1951 | Henning | 174—113 |
| 3,218,592 | 11/1965 | Barrick | 336—208 X |

FOREIGN PATENTS 813,452  5/1959  Great Britain.

DARRELL L. CLAY, *Primary Examiner.*

L. H. MYERS, *Examiner.*

T. J. KOZMA, *Assistant Examiner.*